United States Patent Office 2,977,633
Patented Apr. 4, 1961

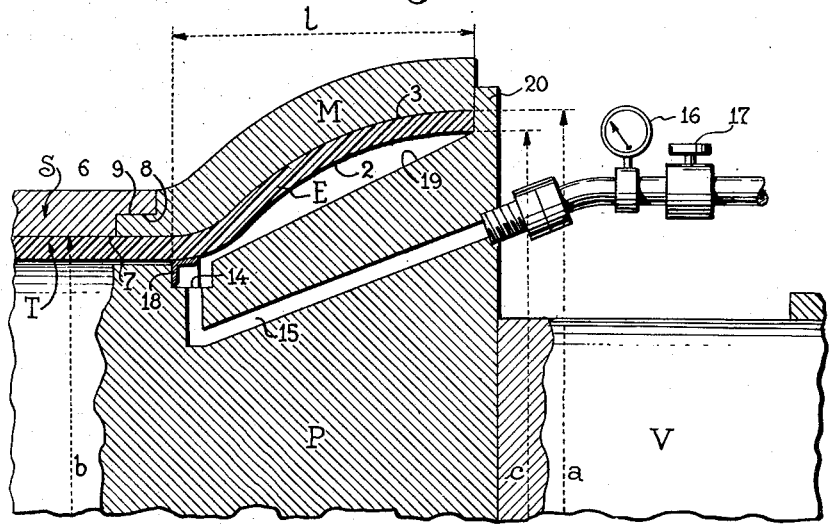
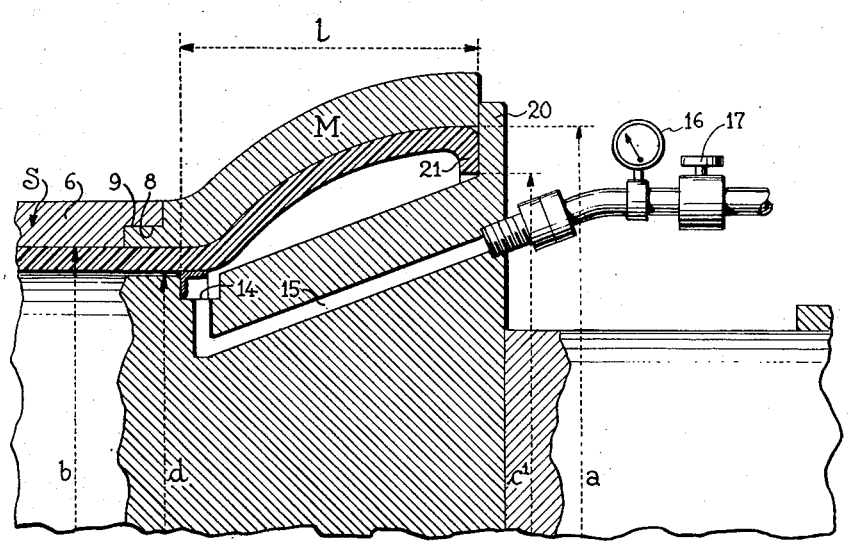

2,977,633
METHOD AND APPARATUS FOR FORMING A SOCKET AT THE END OF A PIPE AND THE PIPE RESULTING THEREFROM

Pierre Breitenstein, Pont-a-Mousson, France, assignor to Compagnie de Pont-a-Mousson, Nancy, France, a French body corporate Filed Nov. 25, 1957, Ser. No. 698,674
Claims priority, application France Nov. 26, 1956
3 Claims. (Cl. 18—19)

The object of the present invention is to provide a method of forming, without difficulty and in a sure manner, at the end of a pipe of thermoplastic material a socket or bell in the form of a body of revolution about the longitudinal axis of the pipe by an extensive deformation of said end.

It is known that thermoplastic materials, such as polyvinyl chloride, are hard in the cold state and become plastic and malleable in the hot state between certain temperature limits.

It is also known that if the thermoplastic material of which a body, tube or the like is composed were perfectly homogeneous, it would be possible, by submitting it to forces having a constant direction and intensity to transform this body according to a well-defined law, after the body has been brought to the malleable state. However, this is not so, since the thermoplastic material is not perfectly homogeneous, and when such forces are exerted on a plastic body in the malleable state, the latter is deformed sometimes in an unexpected way, above all if the surface receiving these forces is large upon application of the latter or very rapidly increases in a more or less uncontrolled way in the course of application of these forces.

Further, for the same reasons these materials undergo irregular deformation under the effect of frictional forces.

The method of the invention is so improved as to avoid these disadvantages and to permit controlling at each instant the deformation of the end of a pipe of thermoplastic material starting from the initial cylindrical form to the final form of the required socket or bell.

This method comprises, after having heated the end of the pipe so as to render it malleable, causing a progressive radial expansion of the pipe within a mould, which has the shape of the required socket and is coaxial with the pipe, by subjecting, on the one hand, the whole of the inner periphery of the transverse end face of the pipe to positive mechanical expanding action and axial compression and, on the other hand, a region of the inner face of the pipe adjacent said end face to the action of a fluid under pressure, the length of said region increasing in accordance with a predetermined law as a function of the radial expansion of said end face.

The applicant has discovered that, owing to these two conjoint expanding actions and axial compressions, there is obtained a perfectly regular expansion of the pipe, the transverse sections of the formed socket remaining exactly circular, since the transverse end face of the pipe undergoes, owing to the mechanical action a regular forced expansion, there being no frictional effect as the surface of the inner periphery of the end face of the pipe submitted to said mechanical action is very small (reduced to a mere edge) and, furthermore, the region of the annular inner face subjected to the action of the gas is not subjected to any friction and increases progressively, thus avoiding any untimely and more or less uneven effect of the gas.

The first expanding action and the axial compression may be advantageously obtained by subjecting the whole of the inner periphery of the end face of the pipe to the action of a punch or ram which is progressively fed axially and inwardly of the pipe, at least a portion of its outer face being divergent in a direction away from the end of the punch adapted to be the first part to come into contact with the end of the pipe.

If the divergent face of the punch is in the form of a truncated cone, said law is a law of proportionality, the region of the pipe subject to the action of the fluid lengthening in proportion to the radial expansion of the transverse end face of the pipe.

A further object of the invention is to provide an apparatus for carrying out the afore-mentioned method.

This apparatus comprises in combination: a mould whose inner face corresponds to the desired outer face of the socket or bell, a device for supporting the pipe, holding the end of the latter in the mould and maintaining the mould stationary coaxially with the pipe, a tool adapted to effect a progressive expansion of the end of the pipe by penetrating the pipe axially of the latter, means for moving said tool and thus obtaining said penetration, and means for admitting fluid under pressure between said tool and the part of the inner face of the end of the pipe situated at each instant opposite said tool.

A further object of the invention is to provide pipes composed of a thermoplastic material and having a socket or bell end obtained by means of the method and machine of the invention.

Further features and advantages of the invention will be apparent from the ensuing description with reference to the accompanying drawings, to which the invention is in no way restricted.

In the drawings:

Fig. 3 is a view similar to Fig. 1, the apparatus being shown at the end of the operation, and Fig. 4 is a view similar to Fig. 1 showing the apparatus at the end of the operation for forming the end of a pipe having a modified socket or bell.

Figure 1:
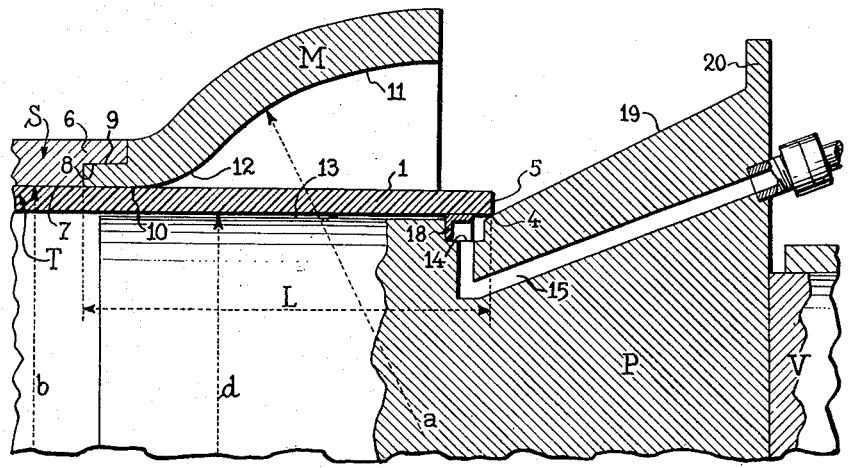
Fig. 1 is a partial diagrammatic axial sectional view of an apparatus embodying the invention, the elements of this apparatus being in the positions they occupy at the start of the forming operation on the end of the pipe.
Figure 2:
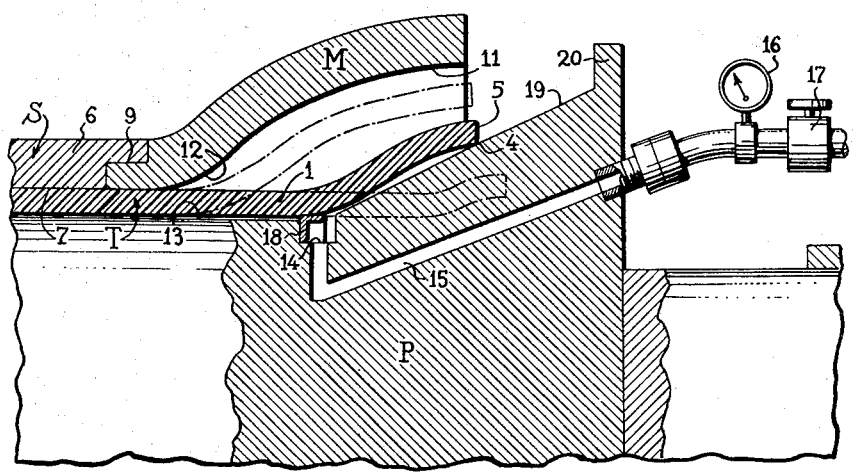
Fig. 2 is a view similar to Fig. 1, the apparatus being shown in the course of operation.

In the embodiment shown in Figs. 1 to 3, the apparatus of the invention is used for expanding the cylindrical end 1 (Fig. 1) of a pipe T composed of thermoplastic material, for example rigid polyvinyl chloride, for the purpose of obtaining a socket or bell end E (Fig. 3) whose inner face 2 and outer face 3 are concentric and part-spherical and are connected by two curved portions to the cylindrical inner and outer faces of the rest of the pipe, the diameter $a$ of the outer face of the socket being much greater than the diameter $b$ of the outer face of the cylindrical part of the pipe. The socket provides at its end a recess having a diameter $c$ (Fig. 3).

The socket, whose axial length is $l$, is obtained by means of the apparatus which will now be described.

This apparatus comprises a supporting and gripping device S adapted to hold the pipe T; a metal mould M in two parts, adapted to receive the end of the pipe T in the course of its expansion, this mould also being held stationary and coaxially of the pipe T by the device S; a punch P adapted to bear against the inner periphery 4 of the transverse end face 5 of the pipe (Fig. 1); a fluid motor or jack V for exerting a thrust on the punch P; and means supplying fluid under pressure to the space between the pipe T and the punch P.

The device S may consist in a vice of any known type, its jaws, one of which is shown at 6, having a part-cylindrical inner face 7 for clamping the cylindrical outer face of the pipe, and an arcuate recess 8 for bearing against a cylindrical spigot 9 formed on the mould M. The inner face of the latter comprises (Fig. 1) a cylindrical portion 10 whose diameter is substantially equal to the outside diameter $b$ of the pipe T, and a portion 11 corresponding to the desired outer face 3 of the socket. In the presently-described embodiment, the portion 11 is therefore part-spherical and it is connected to the cylindrical portion 10 by a curved portion 12.

The punch P comprises, starting from its left or front end shown in the figures, first a part 13 having a cylindrical outer shape whose diameter is substantially equal to the inside diameter $d$ of the pipe T and an annular recess 14 to which is connected a pipe 15 which extends through the punch and supplies fluid under pressure, for example air from a compressed air supply. The pressure of this fluid, indicated by a pressure gauge 16, is regulated by a valve 17. Disposed in the recess 14 is a sealing ring 18 having an L-shaped cross-section which is capable of being applied, by the fluid under pressure from the pipe 15 against the lateral wall of the recess 14 adjacent the cylindrical part 13 and against the inner face of the pipe T. Connected to the recess 14 is a part-conical part 19 the minor diameter of which is equal to the inside diameter $b$ of the pipe T whereas the major diameter at the rear end of the part 19 is equal to the diameter $c$ of the large end of the socket E. The length of the part 19 is equal to that of the part-spherical inner face to be obtained and thus a little less than the overall axial length $l$ of the socket. An annular flange 20, capable of abutting the end face 5 of the mould M, is provided at the large end of the punch.

The method of the invention is carried out with this apparatus in the following manner:

The end 1 of the pipe T is heated over a length L (Fig. 1), which is a little greater than the length $l$ to be deformed, so as to bring the pipe to such temperature that the polyvinyl chloride becomes plastic, that is to a temperature of 150°–160° C.

The pipe T is then placed in the vice S adjacent its end rendered malleable and the mould M is engaged on this end and held fast in the recess 8 when the vice is finally tightened.

The punch P is then moved at constant speed along the axis of the pipe T and inwardly of the latter by means of the jack V; when its tapered part 19 reaches the inner periphery 4 of the transverse end face 5 of the pipe (Fig. 1), compressed air is supplied to the pipe 15.

The compressed air enters the closed annular space defined by the part 19, the sealing ring 18 and the malleable wall of the end of the pipe. The compressed air then exerts on the latter pressure causing radial expansion of the pipe end. The valve 17 is opened in such manner that there prevails in said closed space a pressure of a few kilograms per square centimeter, for example 3 kg./sq. cm.

The compressed air raises the end 1 of the pipe off the conical part 19 of the punch P. Simultaneously, owing to the stress or pressure which is exerted by the conical part 19 on the edge 4 and which in each point is perpendicular to the part 19, the end 1 of the pipe is radially expanded and axially compressed whereas it tends to assume a certain convexity as shown in Fig. 2, where the successive shapes assumed by the end 1 of the pipe in the course of the movement of the punch inwardly of the pipe are shown in dot-dash lines.

The end 1 subsequently comes into contact with the inner part-spherical face 11 of the mould M and, owing to the conjoint actions of the forward movement of the punch and the maintenance of the air pressure in said closed space, the end 1 is urged against an ever-increasing portion of the inner face 11 of the mould. When the flange 20 abuts the end face of the mould, the end 1 of the pipe lies exactly along the inner face 11 of the mould and the required socket E is obtained (Fig. 3). The forward movement of the punch P is stopped.

The end 1 of the pipe previously heated, to 150–160° C., first gradually cools under the effect of the cold compressed air and of its contact with the punch P, and then more rapidly in contact with the cold mould M. In any case, before removing the apparatus and releasing the pipe T, it is necessary to wait until the temperature of the pipe has dropped below 70° C. so that the polyvinyl chloride is completely hardened and stabilized. When stabilization has occurred, that is, when the pipe end is capable of conserving in a permanent manner the socket shape, the punch P is withdrawn from the pipe and the valve 17 is closed. The vice S is released, the mould M removed, and the pipe T withdrawn.

As mentioned hereinbefore, owing to the conjoint actions of the conical part 19 of the punch P and the fluid under pressure, the end 1 of the pipe is in contact with the conical part of the punch P only along its inner edge 4, that is, along the smallest possible surface of the pipe, and friction, which is often the cause of tears and creases in work on plastic materials, is therefore minimized. No crease or tear can occur, since the end of the pipe is supported on a sort of pneumatic cushion whose thickness is maximum near the middle of the deformed part of the pipe end and is practically nil in the region of the ring 18 and of the end face 5, there being, however, a thin film of air between the inner edge 4 and the conical part of the punch P. Further, the end 1 of the pipe is deformed only along a length between the region of contact between the ring 18 and the pipe T and the edge 4 of the face 5. Beyond the ring 18 relative to the jack V, the part of the pipe T which has not yet been encountered by the conical part 19 of the punch P is in no way deformed; on the contrary, it is supported on the cylindrical part 13 of the punch P and pipe deformation is therefore effected in a progressive and controlled manner.

It will be observed that the method of the invention permits the desired socket to be produced very rapidly.

For example, excellent results have been obtained on a pipe composed of rigid polyvinyl chloride under the following conditions:

Outside diameter $a$ of the bell-shaped socket__mm__ 130
Outside diameter $b$ of the pipe_____mm__ 90
Inside diameter $d$ of the pipe_____mm__ 84
Diameter $c$ of the expanded end opening of
 the pipe_____mm__ 124
Length $l$ of the socket_____mm__ 70
Temperature of the end of the pipe_____° C__ 150–160
Pressure of compressed air_____kg./sq. cm__ 3
Temperature of the compressed air_____° C__ 15
Time take to form the socket_____sec__ 30

In the modification shown in Fig. 4, the desired socket comprises at its open end an inner flange 21 which provides an opening having a diameter $c^1$. In this case, the conical part 19 of the punch P has a major diameter $c^1$ instead of $c$. The socket is produced in the manner described hereinbefore and the data provided in the foregoing numerical example still apply except that the diameter $c^1$ replaces the diameter $c$ and is equal to 120 mm.

Although specific embodiments of the invention have been described, many modifications and changes may be made therein without departing from the scope of the invention as defined in the appended claims.

Thus the compressed fluid used to produce the socket may be a liquid or a gas other than compressed air. The mound M and the punch P instead of being cold could be heated separately. The compressed fluid may also be heated at least during the expanding stage of socket formation. The shape of the operative part of the punch P is not necessarily conical.

The socket, which is a body of revolution about the longitudinal axis of the pipe, may of course have any generatrix and directrix, its shape being in no way restricted to the part-spherical shape described hereinbefore; for example, its shape may be parabolic, cylindrospherical, or the like or have a series of flat or curved faces.

Having described my invention what I claim as new and desire to secure by Letters Patent is:

1. A method of forming on an end of a pipe composed of thermoplastic material a socket disposed about the longitudinal axis of the pipe, said method comprising the steps of: heating said end of the pipe so as to render it malleable and to provide a malleable portion, rigidly fixing the unheated portion of the pipe, radially expanding the malleable portion of the heated end within a mold having the shape of the desired socket by subjecting the whole of the inner periphery of the transverse end face of the pipe to a radially expanding penetrating thrust of progressively increasing magnitude and simultaneously applying fluid under pressure to the interior cavity of the pipe adjacent to said inner periphery of the radially expanded transverse end face of the pipe thereby distending said cavity progressively in a longitudinal direction.

2. Apparatus for forming on the end of a pipe composed of thermoplastic material a socket disposed about the longitudinal axis of the pipe, the end of the pipe being rendered malleable by a preliminary heating, said apparatus comprising in combination: a mold having an inner surface including, starting from an open end, a first convergent portion corresponding to the outer surface desired for the socket and a second cylindrical portion following said first portion, said second portion having a diameter equal to the outside diameter of the pipe; means for supporting the pipe and immobilizing the malleable end thereof in said mold by holding the latter coaxial with and stationary relative to the pipe; a punch longitudinally movable along the axis of the pipe for penetration therein, said punch having a substantially truncated conical face which widens from a small front base to a larger rear base, said small front base having a smaller diameter than the inside diameter of the pipe, said large rear base having a larger diameter than the largest diameter of the socket to be formed, said small front base being adapted to penetrate first into the pipe and said larger rear base being adapted to bear against the inner periphery of the transverse end face of the pipe for the purpose of exerting thereon a stress of radial expansion and axial compression; a device for moving said punch and ensuring the penetration of the latter in the pipe; and, means for supplying fluid under pressure between said truncated conical face of said punch and the part of the inner surface of the end of the pipe facing said truncated conical face disposed about the portion of the surface of said punch having penetrated into the pipe.

3. Apparatus for forming on the end of a pipe composed of a thermoplastic material a socket disposed about the longitudinal axis of the pipe, the end of the pipe being rendered malleable by a preliminary heating, said apparatus comprising in combination: a mold having an inner surface including, starting from an open end, a first convergent cylindrical portion corresponding to the outer surface desired for the socket and a second cylindrical portion following said first portion, said second portion having a diameter equal to the outside diameter of the pipe; a device for supporting the pipe and immobilizing its end in said mold by holding the latter coaxial with and stationary relative to the pipe; a punch to ensure a progressive expansion and an axial compression of the transverse end face of the pipe by axial penetration of the punch into the pipe, said punch, from its front end adapted to penetrate first into the end of the pipe, including a front cylindrical portion provided with an outer surface having an outside diameter equal to the inside diameter of the pipe and provided with a peripheral annular recess, a truncated conical portion widening from a small front base adjacent said annular recess to a large rear base, said small base having a diameter equal to the inside diameter of the pipe and said large base having a larger diameter than the largest diameter of the socket to be formed, the outer surface of said front cylindrical portion and said second cylindrical portion of said mold holding therebetween the portion of the end of the pipe which is not yet deformed and said truncated conical portion being adapted to bear against the inner periphery of said transverse end face of the pipe; a sealing ring positioned in said recess to ensure tightness between said front cylindrical portion of said punch and the inner surface of the pipe by bearing against said surface, said packing being narrower axially than said recess and being placed in the latter so that the rear portion of said recess adjacent said truncated conical portion remains free; means for moving said punch and ensuring the penetration of the latter in the pipe; and, means for supplying fluid under pressure in said free portion of the recess.

References Cited in the file of this patent

UNITED STATES PATENTS

| | | |
|---|---|---|
| 2,282,423 | Kopitke | May 12, 1942 |
| 2,446,281 | Harding | Aug. 3, 1948 |
| 2,695,255 | Avery | Nov. 23, 1954 |
| 2,779,996 | Tanis | Feb. 5, 1957 |

FOREIGN PATENTS

| | | |
|---|---|---|
| 639,997 | Great Britain | July 12, 1950 |

OTHER REFERENCES

"Blow Molding" (Bailey), published in Plastics, vol. 2, No. 4, April 1945, pp. 70, 72, 74, 75, 118–120.

"Modified Vacuum Technique," published in British Plastics, vol. 29, No. 7, July 1956, pp. 252, 253.